Dec. 29, 1964    E. O. P. TATTER    3,163,427
RECORD CHANGER
Filed Sept. 19, 1961    6 Sheets-Sheet 1
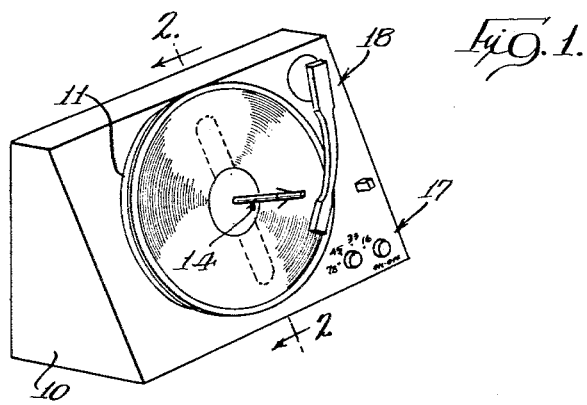
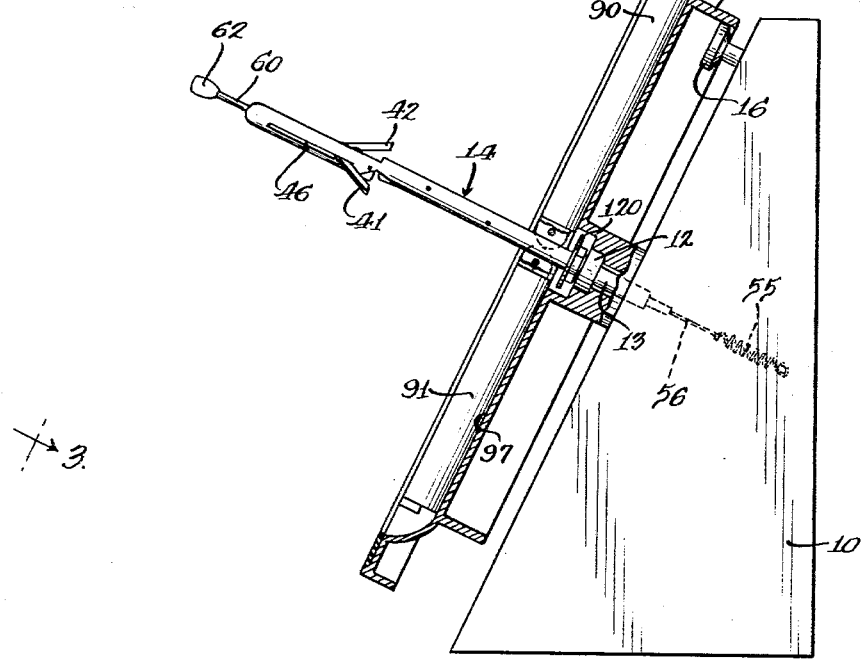
INVENTOR.
Ernest O. P. Tatter
BY Hofgren, Brady,
Wegner, Allen & Stellman
Attys

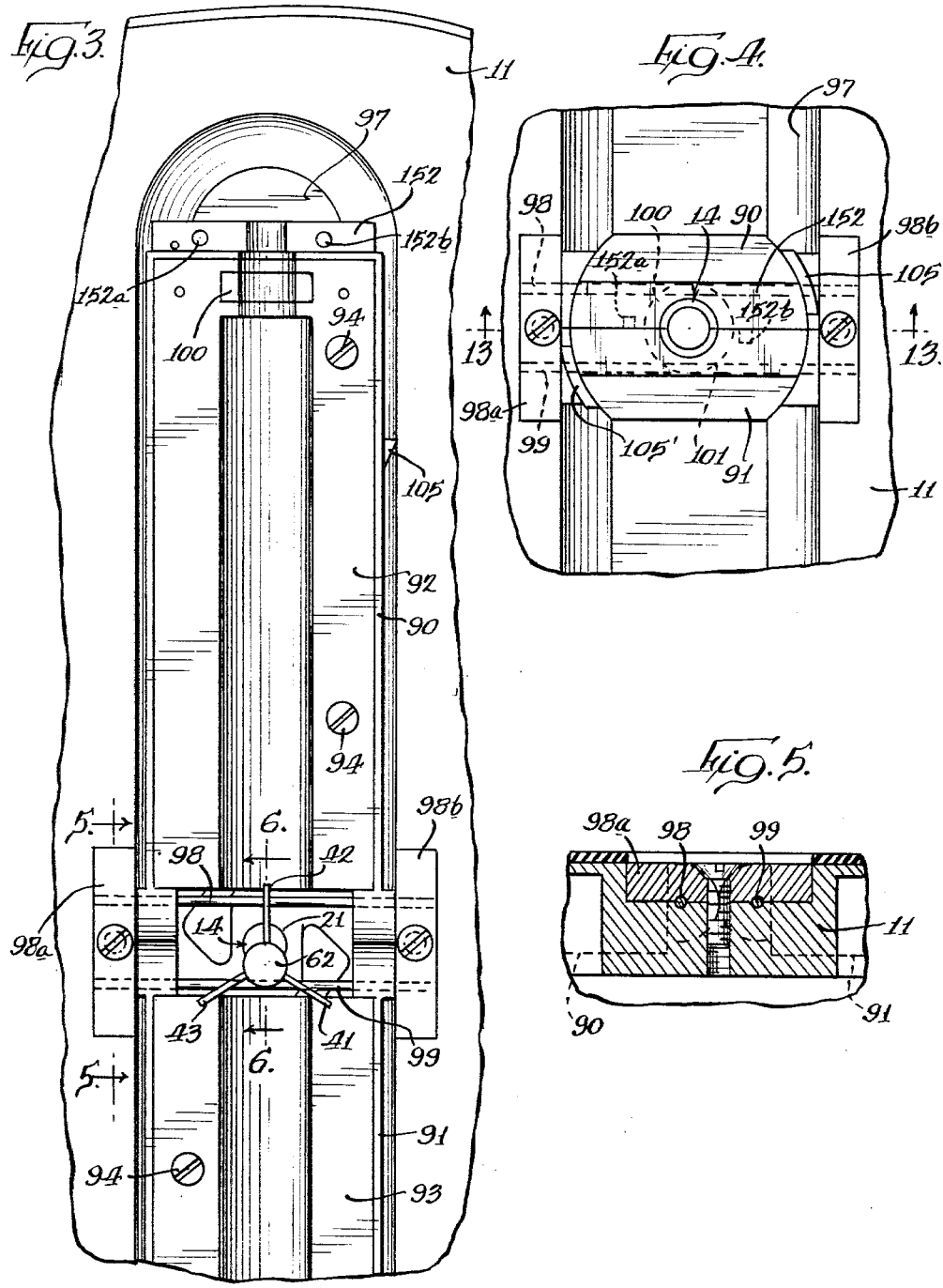

Dec. 29, 1964     E. O. P. TATTER     3,163,427
RECORD CHANGER
Filed Sept. 19, 1961     6 Sheets-Sheet 3
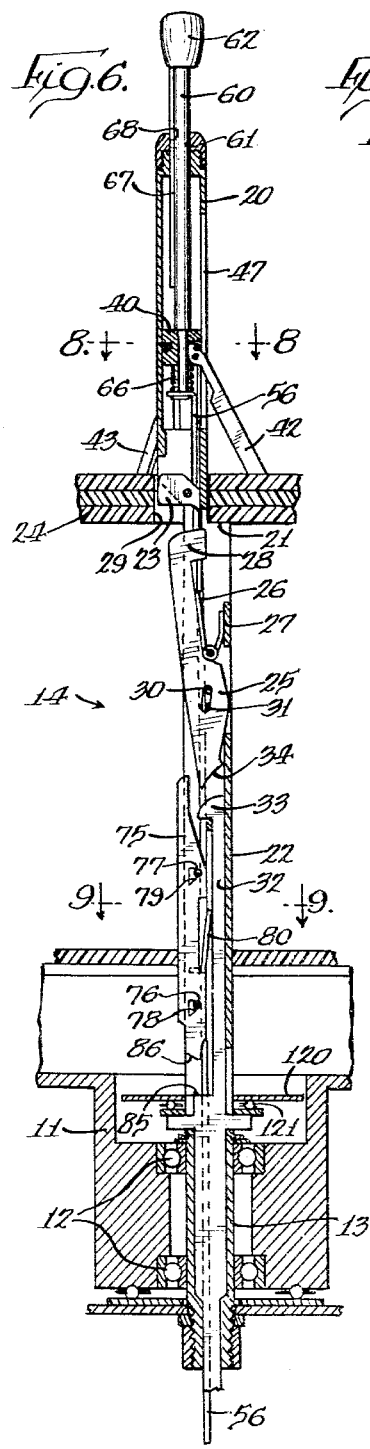
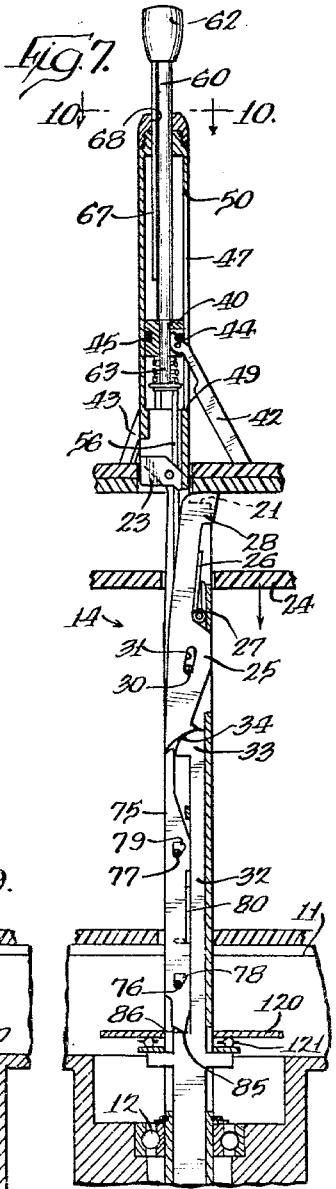
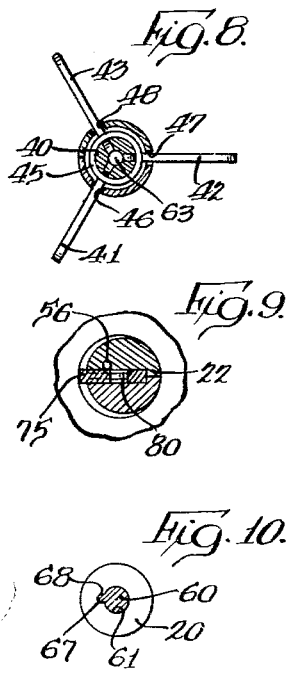
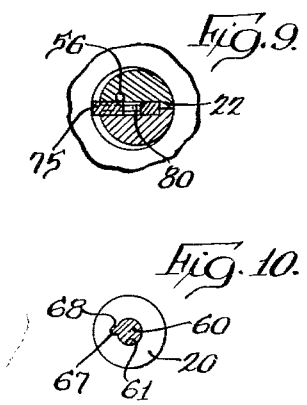
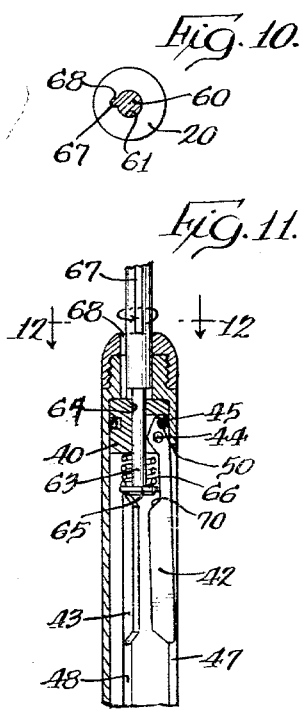
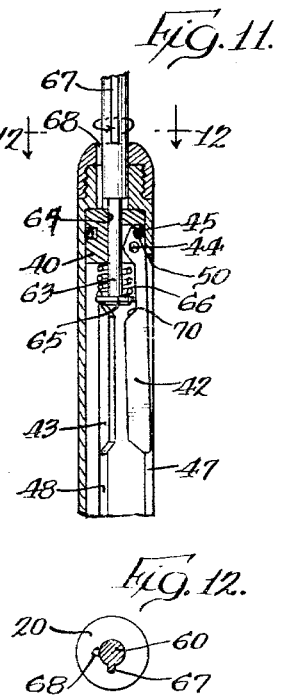
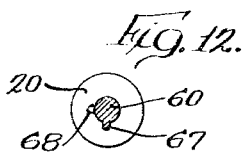

Dec. 29, 1964     E. O. P. TATTER     3,163,427
RECORD CHANGER
Filed Sept. 19, 1961     6 Sheets-Sheet 4
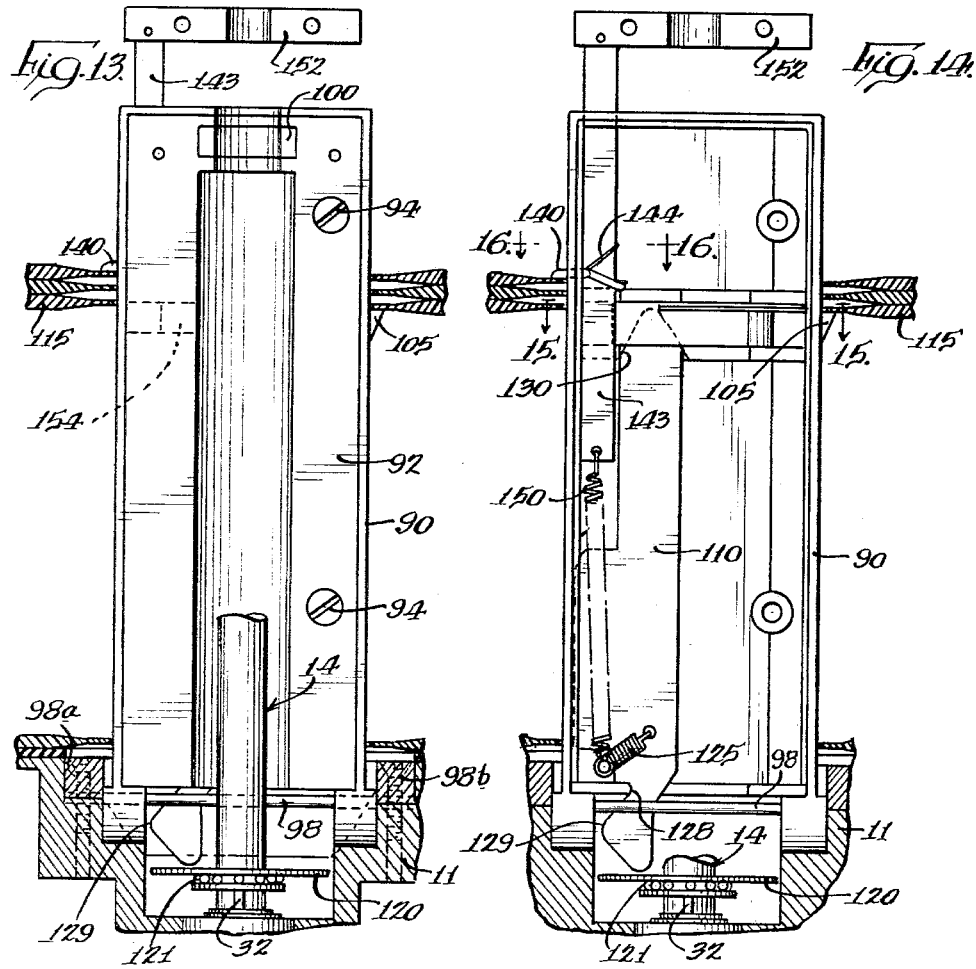
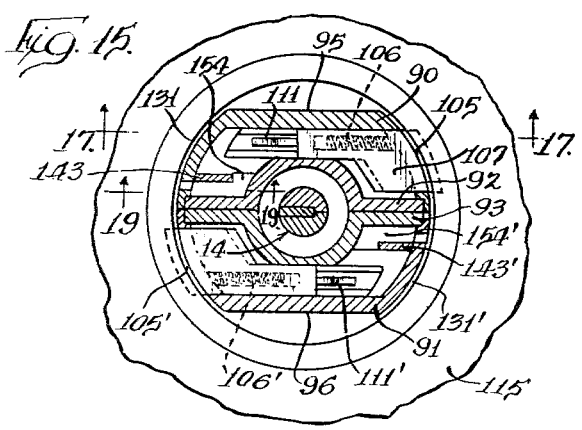
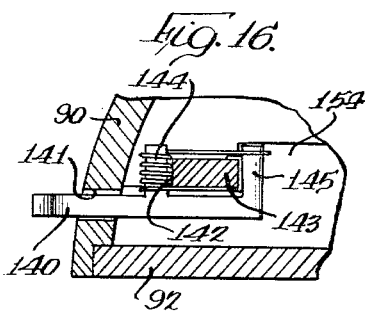

Dec. 29, 1964 E. O. P. TATTER 3,163,427
RECORD CHANGER
Filed Sept. 19, 1961 6 Sheets-Sheet 5
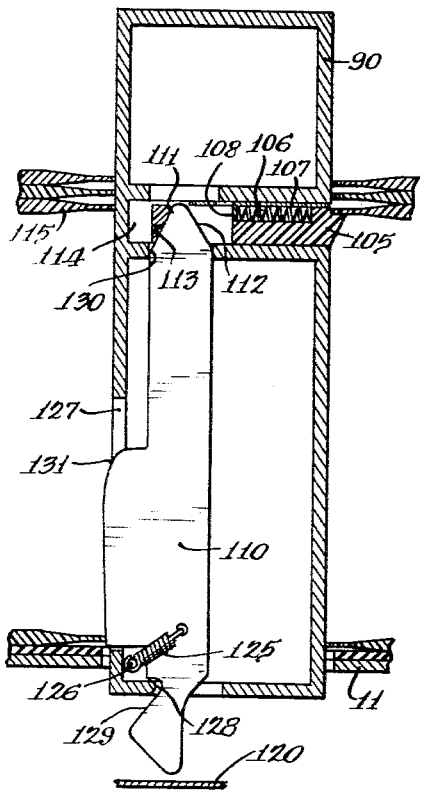
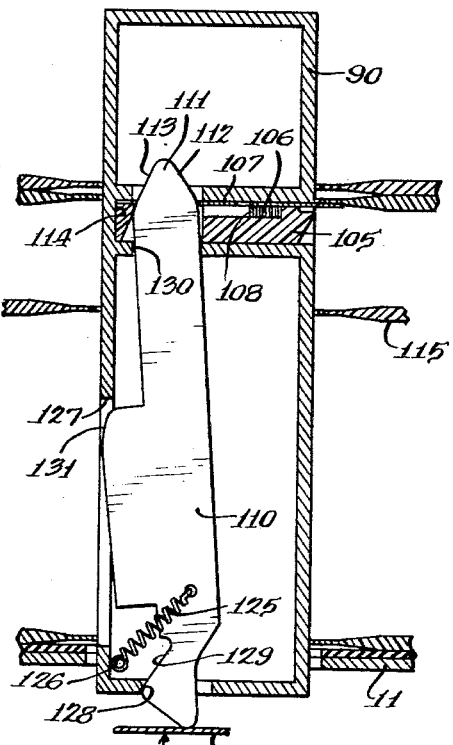
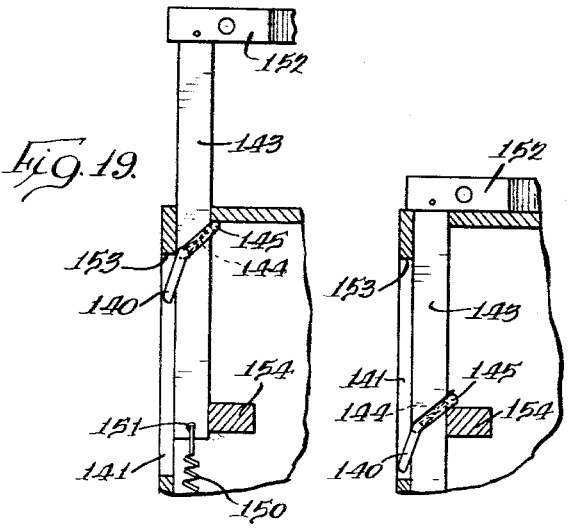
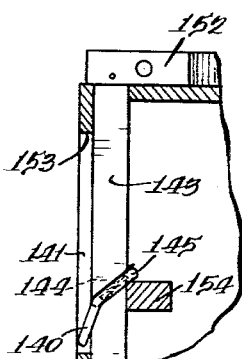

Dec. 29, 1964  E. O. P. TATTER  3,163,427
RECORD CHANGER
Filed Sept. 19, 1961  6 Sheets-Sheet 6

United States Patent Office 3,163,427
Patented Dec. 29, 1964

3,163,427
RECORD CHANGER
Ernest O. P. Tatter, Addison, Ill., assignor to Warwick
Electronics, Inc., a corporation of Delaware
Filed Sept. 19, 1961, Ser. No. 139,289
17 Claims. (Cl. 274—10)

This invention relates to a record changer and more particularly to mechanism for improving the operation and performance of a record changer.

An object of this invention is to provide a new and improved record changer with mechanism for improving the operation and performance thereof.

Another object of the invention is to provide a record changer as defined in the preceding paragraph in which the handling and playing of a record in a disposition other than horizontal is facilitated.

Another object of the invention is to provide in a record changer a small hole record spindle having a shelf for supporting a stack of records spaced from the turntable with record stabilizing means for stabilizing the stack of records and which is manually operable to a retracted position for removal of records from the spindle and which may additionally have means for record hole take-up located adjacent the turntable timed during playing of a record to yieldably engage a record within the central hole thereof in such a manner as to prevent motion between the record and the turntable ordinarily possible due to the difference of the center hole size of the record and the outside diameter of the small hole record spindle, and means for operating the record take-up means simultaneously with operation of means for ejecting a record from the stack on said shelf.

Still another object of the invention is to provide a spindle for large hole records having record hole take-up means disposed adjacent a turntable of the changer in which said means is yieldably urged outwardly of the spindle into engagement with a record in the central hole thereof and means are provided for retracting said means as a record moves along the spindle to the turntable.

A further object of the invention is to provide a spindle as defined in the preceding paragraph in which the spindle additionally has shelf and blade means for supporting a record stack at a distance from the turntable and means carried on the spindle for stabilizing the records on the stack with said last-mentioned means being retractable within the spindle for removal of records from the spindle and wherein the spindle may be formed of two similar parts each carrying components of the shelf and blade means and the record stabilizing means and arranged for storage in a non-use position within recesses in the turntable and having means for holding the parts in adjacent operative relation.

Further objects and advantages will become apparent from the following detailed description taken in connection with the accompanying drawings in which:

FIG. 1 is a perspective view of a record changer with the components arranged for playing of records in a disposition generally vertical;

FIG. 2 is a vertical section taken generally along the line 2—2 in FIG. 1 and on an enlarged scale;

FIG. 3 is a fragmentary plan view on an enlarged scale of the changer turntable shown in FIGS. 1 and 2 with the large hole record spindle parts shown in a retracted position;

FIG. 4 is a fragmentary plan view of the mechanism shown in FIG. 3 with the large hole record spindle parts shown in operative adjacent positions;

FIG. 5 is a fragmentary section taken generally along the line 5—5 in FIG. 3;

FIG. 6 is a longitudinal central section of the small hole record spindle taken along the line 6—6 in FIG. 3;

FIG. 7 is a view similar to FIG. 6 showing a record in the process of moving from the stack to the turntable;

FIG. 8 is a sectional view taken generally along the line 8—8 in FIG. 6;

FIG. 9 is a sectional view taken generally along the line 9—9 in FIG. 6;

FIG. 10 is a section taken along the line 10—10 in FIG. 7;

FIG. 11 is a fragmentary longitudinal section of the parts shown at the upper end of FIGS. 6 and 7 with the record stabilizing means in a retracted position;

FIG. 12 is a section taken generally along the line 12—12 in FIG. 11;

FIG. 13 is a section of the large hole record spindle taken generally along the line 13—13 in FIG. 4;

FIG. 14 is a view similar to FIG. 13 with a cover plate for one of the spindle parts removed;

FIG. 15 is a section taken generally along the line 15—15 in FIG. 14;

FIG. 16 is a fragmentary section taken generally along the line 16—16 in FIG. 14;

FIG. 17 is a section taken generally along the line 17—17 in FIG. 15;

FIG. 18 is a view similar to FIG. 17 showing the record shelf blade means as well as the record hole take-up in an alternate position from that shown in FIG. 17;

FIG. 19 is a fragmentary section taken generally along the line 19—19 showing the record stabilizing means for a large hole record;

FIG. 20 is a view similar to FIG. 19 showing the record stabilizing means in another position;

Figure 21:
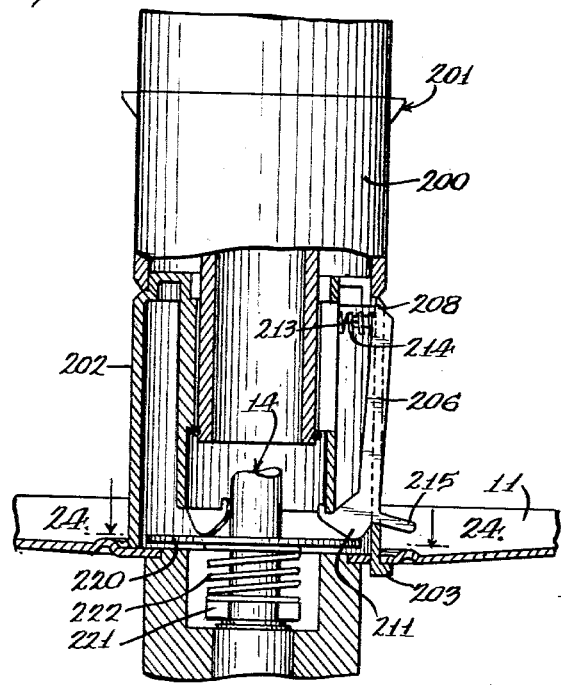
FIG. 21 is a fragmentary elevation view of a changer with an alternate embodiment of large hole record spindle with parts broken away.
Figure 22:
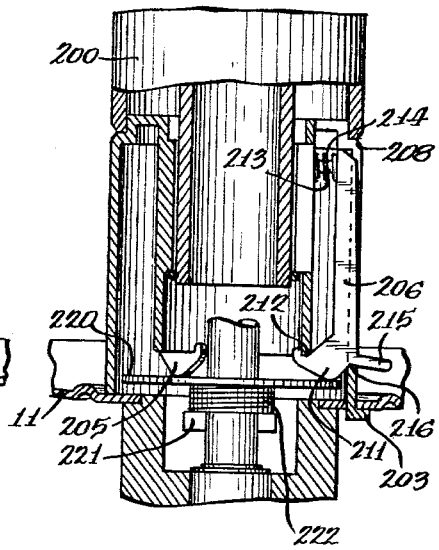
FIG. 22 is a view similar to FIG. 21 showing the record hole take-up means for the spindle in a retracted position.
Figure 23:
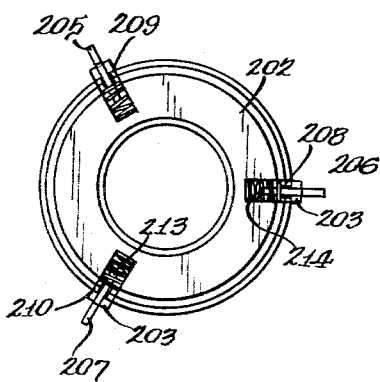
FIG. 23 is a plan view of the lower part of the spindle shown in FIG. 21 which carries the record hole take-up means.
Figure 24:
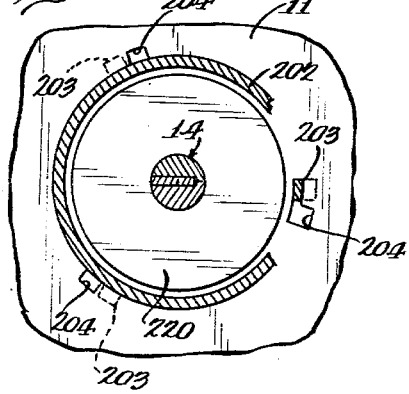
FIG. 24 is a section taken generally along the line 24—24 in FIG. 21.

While this invention is susceptible of embodiment in many different forms, there is shown in the drawings and will herein be described in detail an embodiment of the invention together with a modification thereof with the understanding that the present disclosure is to be considered as an exemplification of the principles of the invention and is not intended to limit the invention to the embodiment illustrated. The scope of the invention will be pointed out in the appended claims.

As shown in FIGS. 1 and 2, the record changer having a base 10 mounts a turntable 11 for rotation in other than a horizontal plane and as shown in an inclined plane which is for reference herein described as generally vertical. Although the turntable is shown at an angle less than the vertical, the structure disclosed can equally well operate with the turntable in a true vertical plane. As shown in FIG. 6, the turntable is rotatably mounted by bearings 12 on the lower end 13 of a small hole record spindle indicated generally at 14. The turntable has a flange 15 at a side thereof which is driven from a drive pulley 16 of a suitable drive mechanism (not shown).

The changer also has the normal controls indicated at 17 and a tone arm indicated at 18 for tracking a record.

The small hole record spindle 14 provides for handling and playing of small hole records and is formed as a two-part post with a partially hollow interior. The spindle has an upper offset end 20 forming a record stack supporting shelf 21 intermediate its ends. The post has a peripheral wall 22 in the areas where it is hollow to receive parts interiorly thereof. As is generally known, the spindle carries a pivotally mounted fin plate guide 23 located above the shelf 21 for causing a stack of records 24 to descend along the upper part 20 of the spindle in a path to rest upon the record shelf 21. Also, the spindle has a record ejecting lever 25 which is urged in a generally counterclockwise direction as viewed in FIG. 6 by a spring 26 engaged between the lever and an abutment 27 on the post. This lever has an upper end 28 which rises up into the central hole 29 of the bottom record of the stack supported on the shelf 21. With a clockwise pivoting movement as viewed in FIG. 6, the lever 25 causes movement of the lowermost record off the shelf 21, as shown in FIG. 7, with the record then moving to the turntable 11. This movement is accomplished by the mounting of the lever 25 on a pin 30 carried by the spindle which is received in an elongated slot 31 in the lever with the actuation of the lever through its cycle of movement being accomplished by an actuator 32 movable in the spindle longitudinally thereof.

The actuator 32 has an upper end 33 for coaction and engagement with a cam end 34 of the ejecting lever 25 whereby elevating movement of the actuator 32 from the position shown in FIG. 6 to that shown in FIG. 7 causes elevation of the ejecting lever 25 and pivoting thereof to the position shown in FIG. 7. As the actuator 32 returns to its lower position as viewed in FIG. 6, the spring 26 functions to return and lower the lever to the position shown in FIG. 6. The actuator 32 is caused to have lowering and raising movements by conventional mechanism (not shown).

It should be noted that although the record changer components are shown in association with a generally vertical changer, the views of the components are displayed in a vertical disposition and references to upper or lower with respect to component parts is merely for clarity of description and with respect to the parts as viewed in the detail figures.

In order to stabilize a stack of records on the shelf 21 and to further provide an assist in causing a record to move along the spindle 14 toward the turntable 11, stabilizing means is provided in association with the upper end 20 of the spindle. This means comprises a block 40 movable within the spindle upper end to which are pivotally mounted three levers 41, 42 and 43 equally spaced about the spindle. Each of these levers is pivotally mounted to the block 40 by an associated pin 44 carried on the block. The levers are yieldably urged to an extended position so as to provide three-point engagement with the top of a record stack by a rubber-like ring 45 which passes around and in engagement with the upper ends of the levers 41, 42 and 43 as shown in FIGS. 6, 8 and 11. In order to permit the levers 41, 42 and 43 to extend outwardly of the spindle, the spindle is provided with a plurality of slots 46, 47 and 48 for the respective levers 41, 42 and 43 which terminate at points 49 and 50 for each slot as indicated in FIG. 7.

In normal operation, the levers 41, 42 and 43 are caused to overlie the record stack under the urging of the ring 45 and are urged in a direction towards the spindle shelf 21 by yieldable means such as a spring 55 located within the base 10 of the changer. This spring is connected to the block 40 by a wire 56 which extends upwardly through the spindle as shown in FIGS. 6 and 9 to connection with the block 40. Means for retracting the stabilizing levers comprises a plunger 60 extending out through an end 61 of the spindle and having a knob 62 facilitating manual engagement. The plunger 60 has a reduced diameter length 63 which loosely passes through a central opening 64 in the block 40 as shown in FIG. 11 with a flange 65 at an end of the reduced part for holding a spring 66 in engagement between the block 40 and the flange which yieldably urges the plunger away from the block 40 and toward the turntable 11.

With the record stabilizing means in operative position as shown in FIGS. 6 and 7 it is possible to retract said means to the position shown in FIG. 11 by an outward extension of the plunger 60 relative to the spindle which, through the spring 66, causes elevation of the movable block 40 carrying the levers 41, 42 and 43 therewith until the levers engage the ends 50 of the slots 46, 47 and 48 which causes inward pivoting movement thereof against the action of the ring 45. The parts are held in this retracted position by rotating the plunger 60 to have a raised rib 67 thereon overlie the end of the spindle. The rib 67 provides a lock to hold the stabilizing means in retracted position and in order to lower the plunger 60 from the position shown in FIG. 11 the rib 67 is aligned with a slot 68 in the end of the spindle. When the stabilizing means is to be moved to extended position the rib 67 is aligned with the slot 68 and the movable block is caused to descend by the urging of the spring 55 connected thereto through the wire 56. At the same time, the previously compressed spring 66 engageable with plunger flange 65 is permitted to expand which causes the flange to move away from the block and the periphery of the flange to engage a cam surface 70 on each of the levers 41, 42 and 43 and move the levers outwardly as further aided by the rubber-like ring 45.

It will thus be apparent that the stabilizing means provides a firm three-point support for the records on the shelf and further assists in causing a record to move from the shelf to the turntable by the urging placed upon the stack due to the action of the spring 55. Due to the connection of the spring 55 to the movable block 40 by the wire 56 the movement of this wire can also be utilized to function as a last record shut-off for the machine since the movable block 40 will have descended to its lowermost position when there are no longer any records remaining in the record stack.

The spindle 14 further has record hole take-up means to prevent a record from crawling up the turntable when the turntable is disposed in other than a horizontal position which can occur due to the central record hole being larger than the diameter of the spindle and further occurring due to wear on the central record hole tending to enlarge it. This hole take-up means embodies a movable member 75 mounted within the spindle on a pair of pins 76 and 77 engageable within generally triangular openings 78 and 79 in the member 75. The take-up member 75 is yieldably urged through a slot in the spindle to an extended position shown in FIG. 6 by a spring 80. The member 75 has its outer surface generally rounded to conform to the contour of the central hole of the record and is retractable to a position within the spindle during the cycle of moving a record to a turntable 11. This retraction is caused by elevation of the actuator 32 having the surface 85 thereon engageable with a surface 86 at the lower end of the take-up member 75 whereby as the actuator 32 is raised the take-up member 75 is also raised and caused to be retracted against the action of the spring 80 by the relative movement of the pins 76 and 77 in the generally triangular slots 78 and 79 in the take-up member. Upon return of the actuator 32, the spring 80 functions to extend the take-up member to engagement with a record.

In order to render the record changer fully versatile, means are provided for handling an playing large hole records with this mechanism embodying a spindle formed of two substantially identical parts 90 and 91 disposed at opposite sides of the small hole record spindle 14. Each of the spindle parts 90 and 91 are of a generally elongate semi-cylindrical construction with each having a generally hollow interior covered by the respective cover plates 92 and 93 attached thereto by screws 94. As shown in FIG. 15, the parts are not strictly cylindrical since there are surfaces 95 and 96 extending longitudinally of the spindle which are flat. The spindle parts 90 and 91 when out of use are mounted to be located within a recess 97 in the turntable and the parts are pivoted on pins 98 and 99 carried by the turntable for movement to an operative position located adjacent each other as shown in FIGS. 4 and 15. The pins 98 and 99 extend from each side of the spindle parts 90 and 91 and are held in location by caps 98a and 98b attached to the turntable.

In the operative position, the spindle parts 90 and 91 surround the small hole record spindle 14 and are held in assembled relation, one with respect to the other, by means in the form of a magnet 100 of an arcuate shape aligned with magnetic permeable material 101 as shown in FIG. 4 with the magnet 100 being in one part and the material 101 in the other part.

Now referring to FIGS. 17 and 18 showing the spindle part 90 the part has record blade and shelf means for co-acting with similar parts in the spindle part 91 to support a record stack and release records singly. The record shelf embodies a shelf member 105 which is normally urged to an extended position as shown in FIG. 17 by a spring 106 and a blade 107 is movably mounted in the spindle part immediately above the shelf member 105. The blade 107 has a downturned flange 108 against which the spring 106 abuts whereby the spring also normally urges the blade 107 to a retracted position in the spindle.

Operation of the record blade and shelf means is performed by a record hole take-up member 110 which extends upwardly within the spindle part and has an upper rounded end 111 which moves from the position of FIG. 17 to that shown in FIG. 18 as the take-up member 110 is moved lengthwise of the spindle part. During this movement a surface 112 at the end engages an end of the record blade 107 to cause extension thereof while compressing the spring 106 to the position shown in FIG. 18 and at the same time a surface 113 on the take-up member 110 engages an end 114 of the shelf member 105 to retract the shelf member further compressing the spring 106. When this action has taken place, the lowermost record in the record stack is permitted to move toward the turntable (this record being shown at 115 in FIG. 18) while the lowermost record remaining in the stack is supported by the blade 107. When the take-up member 110 returns to its initial position the parts return to the position shown in FIG. 17 supporting the record stack on the shelf member 105 as well as the corresponding shelf member of the spindle part 91. In the drawings, the parts in spindle part 91 corresponding to those in spindle part 90 have been given the same reference numeral with a prime affixed thereto. The record take-up member 110 is caused to move by a plate 120 which, as shown in FIGS. 6 and 7, is carried by the actuator 32 for movement longitudinally of the spindle 14 and rotatable relative thereto by bearings 121.

When a large hole record is being played in other than horizontal disposition, the record hole take-up is extremely important since such records tend to be relatively light and tend to climb up the turntable during rotation thereof. Further due to the present commercial construction of such records there is very little area thereof engaging the turntable and there is a substantial record area in engagement with the rotating spindle composed of parts 90 and 91. The record take-up mechanism embodying the take-up member 110 and corresponding member 110' in spindle part 91 during playing of a record are yieldably urged into engagement with the record at the central hole thereof to cause more uniform rotation thereof with the spindle and the turntable. This yieldable mounting of the take-up member 110 as shown in FIGS. 17 and 18 embodies a spring 125 connected between the member and a pin 126 on the spindle part urging the take-up member 110 outwardly of the spindle part through an elongated slot 127 in the spindle. This is permitted by the mounting of the take-up member 110 as shown in FIG. 17 and as the plate 120 tends to raise this member in a record releasing operation the members also retract within the spindle by engagement between a surface 128 on the spindle part and sloped surface 129 at the lower end of the take-up member. Guiding is also accomplished by engagement of a surface 130 on the spindle part. To further facilitate movement of a record onto the turntable a rounded surface 131 is provided on the upper end of the projecting part of the take-up member so as to enable a record to move therebeyond if this part should extend outwardly beyond the spindle.

The spindle parts 90 and 91 further have record stack balacing or stabilizing means with each of these mechanisms being similar and that associated with spindle part 90 being shown in FIGS. 13-16, 19 and 20. This stabilizing means comprises a finger 140 extendable beyond the periphery of the spindle part 90 through a slot 141 extending lengthwise of the part and pivotally mounted within a notch 142 in a bar 143 extending longitudinally of the spindle part 90 is shown in FIGS. 14 and 19. A spring 144 engages between the bar 143 and the finger 140 to urge the finger in a clockwise direction as viewed in FIGS. 14 and 19 with the pivotal movement being limited by lateral part 145 of the finger engageable with the back part of the bar 143.

In order for the finger 140 to exert a stabilizing force on the record stack as well as to assist a record in moving towards the turntable, a spring 150 connected to the base of the spindle part extends to connection with the lower part of the bar 143 as indicated at 151.

In order to remove records from the stack the finger 140 is retractable to a position within the spindle as shown in FIG. 19 by upward movement of the bar 143. This is accomplished by a manually engageable member 152 outside the spindle connected to the bar which, when raised, causes upward movement of the finger 140 to engage an upper end 153 of the slot 141 to pivot the finger counterclockwise to position it within the spindle part, as shown in FIG. 19. Likewise to remove a plurality of records from a turntable when the bar 143 has descended to a position wherein there are no more records present on the record shelf a boss 154 on the interior of cover 92 for the spindle part is located to engage the lateral part 145 of the finger as shown in FIG. 20, and again pivot the finger counterclockwise to a retracted position. As shown in FIG. 13, this boss 154 is located at a level slightly beneath the record shelf member 105. The record stack stabilizing bar 143 is guided in its longitudinal movement between a part of the boss 154 on the cover 192 and by a rear part of the shelf member 105 as shown in FIG. 15. Again, as indicated previously, corresponding parts of spindle part 91 are given the same reference numeral with primes affixed thereto. It will be evident that the bar 143 descends to its lowermost level when no records are present on the record shelf means and thus a signal may be derived from this movement for actuating the last record shut off operation of the changer. A pair of interlocking lugs and recesses for alignment of the spindle parts are indicated at 152a and 152b.

An alternate embodiment of the large hole record spindle is shown in FIGS. 21 to 24 in which a spindle 200 has conventional record blade and shelf means indicated generally at 201 and has a lower separable section 202 which is interfitted with the turntable 11 by a bayonet-type connection including lugs 203 at the lower end of the spindle and notches 204 in the turntable 11. In this embodiment the record take-up means embodies three equally spaced apart levers 205, 206 and 207 each of which is extendable through its respective slots 208, 209, 210 in the lower part 202 of the spindle. Each of these levers and their mountings are similar and as shown in respect to lever 206 a foot 211 thereof is rockably mounted on an annular flange 212 of the spindle and is urged outwardly of the spindle by a spring 213 held in place by a pin 214 on the lever 206 and abutting against an interior part of the spindle. The outward movement of the lever 206 is limited by the engagement of a laterally extending foot 215 with a bottom 216 of the slot 208.

An actuating plate for operating the levers 206, 205 and 207 is indicated at 220. When in its lower position as shown in FIG. 21 outward extension of the take-up levers is permitted and upon raising movement thereof causes the levers to be retracted into the spindle. The elevating movement of the plate 220 is accomplished by movement of a collar 221 along the spindle 14 which through a spring 222 causes movement of the plate 220. As will be seen, there are no permanent connections to the turntable or the spindle 14 so that the spindle 200 can easily be removed when small hole records are to be played. The record blade and shelf means 201 are actuated from the ejector lever 25 as is well known in the art.

A record changer has been disclosed which is capable of playing records in horizontal or generally vertical disposition in which the spindle for small hole records has record stack stabilizing means as well as record hole take-up means and a spindle for playing large hole records fittable around the small holes record spindle has record stack stabilizing means and also record hole take-up means.

I claim:

1. In a record changer having a turntable which is disposed for playing records at an angle and for playing records having center holes of differing sizes, a first spindle for small hole records having a record supporting shelf, rectractable means on the first spindle for stabilizing a record or records on said shelf, means for shifting a record off said shelf for movement to the turntable, and second spindle means carried by the turntable movable between a first inoperative position below the upper surface of said turnable and a second operative position surrounding the first spindle for receiving large hole records, means carried by said second spindle means for supporting a record stack and successively releasing records for movement to the turntable, means carried on second spindle and urged toward the turntable for stabilizing the record stack, means on the first spindle adjacent the turntable for yieldably engaging a record hole periphery to take up any play in the record, and means on said second spindle means for taking up any play in a large hole record.

2. A record changer for playing records disposed somewhat vertically including, an inclined turntable having a surface for supporting records, a first small record hole spindle extending outwardly of the turntable at an angle to the horizontal, a record stabilizing mechanism on the first spindle for stabilizing a stack of records on the spindle and having resilient means for urging said records along said spindle toward said turntable to facilitate movement of the lowermost record in the record stack along said spindle toward the turntable, a record hole engaging means on the spindle for causing a record to travel with the turntable, a second large hole record spindle carried by the turntable and movable from a position below said turntable surface to a position above said turntable surface surrounding the first spindle, means on the second spindle for stabilizing a record stack on the second spindle and including resilient means for urging said records along said second spindle toward said turntable to facilitate movement of the lowermost record in the record stack along said second spindle toward the turntable, and means on the second spindle for engaging a large hole record on the turntable to prevent slippage of a record on the turntable.

3. In a record changer, a record spindle having a record stack supporting shelf, means for shifting records successively off said shelf from the bottom of the record stack, and record stack stabilizing means on said spindle comprising, a plurality of slots in the spindle wall extending toward the upper end thereof from a point adjacent the shelf, a plurality of levers associated one with each of said slots, a movable block within the spindle to which each of said levers is pivotally connected adjacent an end thereof, resilient means for urging said levers outwardly of the spindle through said slots, and means for retracting the levers within the spindle for removal of records from the spindle.

4. A record changer as defined in claim 3, in which said lever retracting means includes a surface on each of said levers engageable by an upper end of the associated slot to move the lever to a position within the spindle as the movable block moves upwardly in the spindle against the action of said resilient means, and a stem associated with said block and extending beyond the upper end of the spindle for manual engagement whereby an upward movement of the stem moves the block upwardly to retract the levers, and coacting means on the spindle and stem for locking the stem in an upper position.

5. A record changer as defined in claim 4 in which said stem is movable relative to said block, coacting means on the stem and levers for causing extension of the levers upon relative movement between the stem and block as the stem moves from said upper position, and spring means for urging the block downwardly of the spindle to move the levers toward the spindle shelf and for urging movement of the stem relative to the block.

6. A record changer as defined in claim 5 in which said spring means includes a spring remote from the spindle and connected to the block by a wire extending through the spindle.

7. A record changer as defined in claim 4 in which there are three of said levers equally spaced about the periphery of said spindle.

8. A record changer as defined in claim 3 in which said means for shifting a record off said shelf includes a record ejection lever movably mounted on the spindle, a record hole take-up member mounted on the spindle, means yieldably urging the take-up member outwardly of the spindle, and a member movable within the spindle for operating both said record ejection lever and the take-up member.

9. In a record changer having a turntable, means for holding a small hole record in position on the turntable, a large hole record spindle associated with the turntable including means for supporting a stack of records spaced from the turntable, means for releasing a record from the stack for movement to the turntable, and means adjacent the turntable yieldably movable beyond the periphery of the spindle to engage a record on the turntable within the central hole of the record to cause movement of the record with the turntable and to center the record relative to the spindle comprising, three elongated members equally spaced about the spindle, recesses in the spindle one for each member, a plurality of surfaces in the spindle associated one with each of said members for engagement with a member and about which the member may pivot, a plurality of springs extended one between each member and spindle urging the members outwardly of the spindle, and means operable from beneath the spindle and engageable with the members for retracting the members within the spindle against the action of the springs to permit movement of a record from the record stack to the turntable.

10. In a record changer having a turntable inclined to the horizontal, a post for small hole records, a pair of longitudinal recesses in said turntable extending radially of said post, a spindle for large hole records composed of two similar parts, means pivotally mounting said parts on the turntable for movement between a first position with each part in an associated one of said recesses and a second position extending normally to the turntable adjacent to each other and surrounding said post, means for holding said parts in adjacent relation, record shelf and blade means on each part for together supporting a record stack and releasing records singly for movement to the turntable, means for record hole take-up carried by the spindle, means for stabilizing the record stack carried by the spindle, and means urging the stabilizing means toward the turntable.

11. In a record changer as defined in claim 10 in which said means for holding said parts in adjacent relation comprises magnet means carried by said parts.

12. In a record changer having a turntable, a post for small hole records, a pair of longitudinal recesses in said turntable extending radially of said post, a spindle for large hole records composed of two similar parts, means pivotally mounting said parts on the turntable for movement between a first position with each part in an associated one of said recesses and a second position extending normally to the turntable adjacent to each other and surrounding said post, means for holding said parts in adjacent relation, record shelf and blade means on each part for together supporting a record stack and releasing records singly for movement to the turntable, and means for record hole take-up comprising a member in each of said parts extendable through a recess in the associated spindle part, a spring urging each member outwardly of the spindle, means at one end of each member for operating the shelf and blade means of the associated part and means adjacent the other ends of the members for engaging the members to move the members in one direction for retraction of the members and operation of the blade and shelf means and in an opposite direction for extension of the members under the urging of the springs.

13. In a record changer having a turntable, a post for small hole records, a pair of longitudinal recesses in said turntable extending radially of said post, a spindle for large hole records composed of two similar parts, means pivotally mounting said parts on the turntable for movement between a first position with each part in an associated one of said recesses and a second position extending normally to the turntable adjacent to each other and surrounding said post, means for holding said parts in adjacent relation, record shelf and blade means on each part for together supporting a record stack and releasing records singly for movement to the turntable, and means for stabilizing a stack of records and urging the stack toward the turntable comprising a pair of rods one in each of said parts, spring means urging said rods toward the turntable, a slot in each of said spindle parts adjacent the blade and shelf means, a pair of fingers movably mounted one on each of said rods adjacent said slots, means urging said fingers outwardly of the slots, manually engageable means for shifting said rods against the action of said spring means whereby the fingers are retracted by engagement thereof with an end of said slots for removal of records from the stack, and means for retracting the fingers when the fingers have moved to a position adjacent the blade and shelf means when there are no records supported thereby.

14. In a record changer having a turntable with a surface for supporting records, a post for small hole records, a spindle for large hole records composed of two similar parts, means mounting said parts on the turntable for movement between a first position below the turntable surface and a second position extending normally to the turntable and adjacent to each other and surrounding said post, means for holding said parts in adjacent relation, record shelf and blade means on each part for together supporting a record stack and releasing records singly for movement to the turntable, and means for record hole take-up comprising a member in each of said parts extendable through a recess in the associated spindle part, means urging each member outwardly of the spindle, means at one end of each member for operating the shelf and blade means of the associated part, and means adjacent the other ends of the members for engaging the members to move the members in one direction for retraction of the members and operation of the blade and shelf means and in an opposite direction for extension of the members under the urging of the springs.

15. In a record changer having a turntable, a spindle for large hole records composed of two similar parts, means for holding said parts in adjacent relation, record shelf and blade means on each part for together supporting a record stack and releasing records singly for movement to the turntable, and means for record hole take-up comprising a pair of members one in each of said parts extendable through a recess in the associated spindle part, means urging each member outwardly of the spindle, means on each member for operating the shelf and blade means of the associated part and means adjacent the members for engaging the members to move the members in one direction for retraction of the members and operation of the blade and shelf means and in an opposite direction for extension of the members under the urging of the springs to an operative position.

16. In a record changer having a turntable, a spindle for large hole records composed of two similar parts, means for holding said parts in adjacent relation, record shelf and blade means on each part for together supporting a record stack and releasing records singly for movement to the turntable, and means for stabilizing a stack of records and urging the stack toward the turntable comprising a pair of rods one in each of said parts, means urging said rods toward the turntable, a slot in each of said spindle parts adjacent the blade and shelf means, a pair of fingers movably mounted one on each of said rods adjacent said slots, means urging said fingers outwardly of the slots, manually operable means for shifting said rods against the action of said urging means whereby the fingers are retracted by engagement thereof with an end of said slots for removal of records from the stack, and means engageable by the fingers for retracting the fingers when the fingers have moved to a position adjacent the blade and shelf means when there are no records supported by the blade and shelf means.

17. In a record changer having a turntable, a post for small hole records, a pair of longitudinal recesses in said turntable extending radially of said post, a spindle for large hole records composed of two similar parts, means pivotally mounting said parts on the turntable for movement between a first position with each part in an associated one of said recesses and a second position extending normally to the turntable and adjacent to each other, means for holding said parts in adjacent relation, record shelf and blade means on each part for together supporting a record stack and releasing records singly for movement to the turntable, means for stabilizing a stack of records and urging the stack toward the turntable comprising a pair of rods one in each of said parts, spring means urging said rods toward the turntable, a slot in each of said spindle parts adjacent the blade and shelf means, a pair of fingers movably mounted one on each of said rods adjacent said slots, means urging said fingers outwardly of the slots, manually engageable means for shifting said rods against the action of said spring means whereby the fingers are retracted by engagement thereof with an end of said slots for removal of records from the stack, and means for retracting the fingers when the fingers have moved to a position adjacent the blade and shelf means when there are no records supported thereby, and means carried on each of the spindle parts having a surface for engaging a record hole for take-up and for operating the shelf and blade means.

(References on following page)

References Cited by the Examiner

UNITED STATES PATENTS

| | | | |
|---|---|---|---|
| 1,438,000 | 12/22 | Underhill | 274—10 |
| 1,931,487 | 10/33 | Collison et al. | 274—10 |
| 2,293,212 | 8/42 | Offen | 274—10 |
| 2,504,596 | 4/50 | Scriven et al. | 274—10 |
| 2,629,604 | 2/53 | Pifer | 274—10 |
| 2,643,129 | 6/53 | Habegger | 274—10 |
| 2,838,315 | 6/58 | Staar | 274—39 |
| 2,868,546 | 1/59 | Roof | 274—10 |
| 2,918,288 | 12/59 | Van Antwerp | 274—10 |
| 2,918,289 | 12/59 | Hardy | 274—10 |
| 2,926,019 | 2/60 | Crotty | 274—10 |
| 2,946,595 | 7/60 | Da Costa | 274—10 |
| 3,107,098 | 10/63 | Hardy | 274—105 |

FOREIGN PATENTS 1,177,975   12/58   France.

NORTON ANSHER, *Primary Examiner*.
JOHN P. WILLMAN, *Examiner*.